(12) United States Patent
Russell et al.

(10) Patent No.: US 9,048,932 B2
(45) Date of Patent: Jun. 2, 2015

(54) METHOD AND APPARATUS FOR CO-EXISTENCE OF AN OFDMA TRANSMITTER WITH A SYNCHRONOUS FRAME-BASED TRANSMITTER

(75) Inventors: Michael E Russell, Lake Zurich, IL (US); Arnold Sheynman, Northbrook, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 734 days.

(21) Appl. No.: 12/367,500

(22) Filed: Feb. 6, 2009

(65) Prior Publication Data
US 2010/0203832 A1    Aug. 12, 2010

(51) Int. Cl.
*H04B 7/00* (2006.01)

(52) U.S. Cl.
CPC ...................................... *H04B 1/525* (2013.01)

(58) Field of Classification Search
CPC ....................................... H04W 88/00–88/188
USPC ........ 455/41.2, 88, 552.1, 553.1, 67.11, 63.1; 370/450, 454, 459, 462
See application file for complete search history.

(56) References Cited

U.S. PATENT DOCUMENTS

| | | | |
|---|---|---|---|
| 5,943,333 A | 8/1999 | Whinnett et al. |
| 7,039,358 B1 | 5/2006 | Shellhammer et al. |
| 7,046,649 B2 | 5/2006 | Awater et al. |
| 7,095,754 B2 | 8/2006 | Benveniste |
| 7,099,671 B2 | 8/2006 | Liang |
| 7,545,787 B2 | 6/2009 | Bitran et al. |
| 2002/0122405 A1 | 9/2002 | Liang |
| 2002/0142779 A1 | 10/2002 | Goto et al. |
| 2004/0242159 A1 | 12/2004 | Calderon et al. |
| 2005/0215197 A1 | 9/2005 | Chen et al. |
| 2005/0239474 A9 | 10/2005 | Liang |

(Continued)

FOREIGN PATENT DOCUMENTS

| | | |
|---|---|---|
| EP | 1119137 A | 7/2001 |
| EP | 1119137 B1 | 8/2006 |

(Continued)

OTHER PUBLICATIONS

Patent Cooperation Treaty, International Searching Report and Written Opinion of the International Searching Authority for International Patent Application No. PCT/US2010/034650 Jul. 30, 2010, 16 pages.

(Continued)

*Primary Examiner* — Sibin Chen
(74) *Attorney, Agent, or Firm* — Lerner, David, Littenberg, Krumholz & Mentlik, LLP

(57) ABSTRACT

A method and apparatus reduces the likelihood of packet loss when an OFDMA transceiver and synchronous frame-based transceiver are operating on the same device. More specifically, a method protects reception of Bluetooth signals (such as reception of slave device signals) from co-existence interference caused by co-located OFDMA transceiver transmissions. The method receives a transmission-enable (TXE) signal indicating that the OFDMA transceiver is transmitting, determines an estimated transmission-enable (TXE') signal indicating when the OFDMA transceiver is expected to be transmitting in the future, and sends the TXE' signal to the Bluetooth transmitter to shut down Bluetooth transmissions when a transmission is expected to be sent from the OFDMA transceiver.

17 Claims, 6 Drawing Sheets

(56) References Cited

U.S. PATENT DOCUMENTS

| | | |
|---|---|---|
| 2005/0246754 A1 | 11/2005 | Desai et al. |
| 2006/0239223 A1 | 10/2006 | Sherman et al. |
| 2006/0246932 A1 | 11/2006 | Liang |
| 2006/0252418 A1 | 11/2006 | Quinn et al. |
| 2006/0292986 A1 | 12/2006 | Bitran et al. |
| 2006/0292987 A1 | 12/2006 | Ophir et al. |
| 2007/0066314 A1 | 3/2007 | Sherman et al. |
| 2007/0099567 A1 | 5/2007 | Chen et al. |
| 2007/0135162 A1 | 6/2007 | Banerjea et al. |
| 2007/0153749 A1 | 7/2007 | Waxman |
| 2007/0183352 A1 | 8/2007 | Muhammad et al. |
| 2007/0183383 A1 | 8/2007 | Bitran et al. |
| 2007/0184798 A1 | 8/2007 | Bitran et al. |
| 2007/0184835 A1 | 8/2007 | Bitran et al. |
| 2007/0232358 A1 | 10/2007 | Sherman |
| 2007/0275746 A1 | 11/2007 | Bitran |
| 2007/0281743 A1 | 12/2007 | Palin et al. |
| 2008/0037458 A1 | 2/2008 | Myszne |
| 2008/0051085 A1 | 2/2008 | Ganton |
| 2008/0062919 A1 | 3/2008 | Chen et al. |
| 2008/0080555 A1 | 4/2008 | Carter et al. |
| 2008/0089261 A1 | 4/2008 | Wentink |
| 2008/0139212 A1 | 6/2008 | Chen et al. |
| 2008/0205365 A1 * | 8/2008 | Russell et al. ............... 370/341 |
| 2009/0147838 A1 | 6/2009 | Shida et al. |
| 2010/0061326 A1 | 3/2010 | Lee et al. |

FOREIGN PATENT DOCUMENTS

| | | |
|---|---|---|
| EP | 1806872 A1 | 7/2007 |
| WO | 2006069352 A1 | 6/2006 |
| WO | 2007002688 A2 | 1/2007 |
| WO | 2008106302 A2 | 9/2008 |

OTHER PUBLICATIONS

Patent Cooperation Treaty, International Search Report and Written Opinion of the International Searching Authority for International Application No. PCT/US2008/053555, Nov. 20, 2008, 13 pages.

U.S. Patent and Trademark Office, Office Action for U.S. Appl. No. 11/680,067, Jun. 25, 2010, 19 pages.

United States Patent and Trademark Office, "Non-Final Office Action" for U.S. Appl. No. 12/488,075, Sep. 18, 2012, 14 pages.

United States Patent and Trademark Office, "Non-Final Office Action" for U.S. Appl. No. 12/488,075, May 14, 2013, 15 pages.

U.S. Appl. No. 11/567,744, filed Dec. 7, 2006, in the name of Xiang Chen et al., entitled "Apparatus and Method for Interoperation of Various Radio Links with a Piconet Link in a Wireless Device".

U.S. Appl. No. 11/680,067, filed Feb. 28, 2007, in the name of Michael E. Russell et al., entitled "Method and Apparatus for Coexistence".

Bluetooth Sig, "Specification of the Bluetooth System: Wireless Connections Made Easy", Core V2.1 + EDR, Jul. 26, 2007, pp. 1-30 vol. 0, pp. 26-30 vol. 1.

Bluetooth Sig, "Specification of the Bluetooth System: Wireless Connections Made Easy", Core V2.1 + EDR, Jul. 26, 2007, vol. 0 pp. 1-30, vol. 1 pp. 26-30.

* cited by examiner

METHOD AND APPARATUS FOR CO-EXISTENCE OF AN OFDMA TRANSMITTER WITH A SYNCHRONOUS FRAME-BASED TRANSMITTER

FIELD

The present invention relates generally to the field of wireless communication devices. More particularly, the present invention relates to co-existence of an orthogonal frequency division multiple access system with a synchronous frame-based system.

BACKGROUND

As the number of wireless protocols supported by wireless communication devices increases, the issue of wireless signal interference becomes more and more prevalent. Many of these wireless standards operate at frequencies located nearby one another. For example, 4G wide area network technologies such as IEEE 802.16e wireless metropolitan area network communications (sometimes referred to as WiMAX) and 3GPP Long Term Evolution (LTE) operate in the 2.6 GHz frequency band while IEEE 802.11b/g wireless local area network communications (sometimes referred to as WiFi), and IEEE 802.15 wireless personal area network communications (sometimes referred to as Bluetooth) operate in the 2.4 GHz ISM band.

Due to the close physical proximity of transceivers for each technology on a mobile device, such as a dual-mode WiMAX/CDMA cellular phone with Bluetooth, transmissions to or from one transceiver can cause upwards of 58% packet loss for the other transceiver in certain situations. This happens most noticeably when one transceiver is transmitting while the other transceiver is set to receive. For example, a signal transmitted by a WiMAX transceiver in such a dual-mode phone overpowers the co-located Bluetooth receiver with what is interpreted as noise.

Co-existence refers to the ability to operate two wireless technologies, such as WiMAX and Bluetooth, simultaneously on the same device without significant degradation to either's operation. Co-existence solutions should not rely upon synchronization of the clocks for each technology, so that energy appears to be spread randomly through the ISM band and does not coordinate with licensed bands. This creates an opportunity to develop efficient methods for reducing co-existence types of interference while staying within the constraints put in place for the ISM frequency band.

Some methods created to deal with this co-existence problem rely upon access to the inner workings of both transceivers' integrated circuits. These types of solutions require using chips from the same manufacturer in order to lessen the impact of co-existence interference. Those types of solutions, however, present a problem in that they force purchasers to use chips from the same manufacturer in order to alleviate at least some of the interference. Thus, there is an opportunity to develop a solution that promotes co-existence irrespective of transceiver chip manufacturers.

DETAILED DESCRIPTION OF THE EMBODIMENTS

An apparatus and method reduces the likelihood of packet loss when an Orthogonal Frequency Division Multiple Access (OFDMA) transceiver and a synchronous frame-based transceiver, operating at closely spaced frequencies, are operating within the same wireless communication device. More specifically, a method protects reception of Bluetooth signals (such as reception of slave device signals) from co-existence interference caused by co-located OFDMA transceiver transmissions. The method receives a transmission enable (TXE) signal indicating that the OFDMA transceiver is transmitting, determines an estimated transmission enable (TXE') signal indicating when the OFDMA transceiver is expected to be transmitting in the future, and sends the TXE' signal to the Bluetooth transmitter to shut down Bluetooth transmissions when a transmission is expected to be sent from the OFDMA transceiver.

This apparatus and method is capable of working with different 4G (e.g., WiMAX, LTE) and ISM band (e.g., Bluetooth, WiFi) technologies. The apparatus and method does not require access to the internal workings of the individual transceivers and thereby provides for more flexibility in using different manufacturers for each chip. This apparatus and method works in both Time Division Duplex (TDD) and Frequency Division Duplex (FDD) systems, and protects the transmission of the OFDMA transceiver along with the receipt of incoming transmissions on the OFDMA transceiver.

Protecting Bluetooth from WiMAX interference would expand existing co-existence features, which protect WiMAX from Bluetooth interference. Also, because WiMAX has both time division duplex (TDD) and frequency division duplex (FDD) modes, there is an opportunity to address co-existence in both TDD and FDD modes.

Synchronous Bluetooth links (Synchronous Connection Oriented) are usually used for voice communications, and SCO links have fixed timeslots. It is not acceptable to let Bluetooth consistently degrade the licensed band used by WiMAX, and the fixed timeslots in SCO links allows for advanced estimation of when a given SCO timeslot will coincide with a WiMAX data packet. When the WiMAX transceiver is part of a TDD system, it is necessary to protect both the WiMAX receiver download from Bluetooth transmissions and the Bluetooth receiver from WiMAX transmission. When the WiMAX transceiver is part of a FDD system, only the closest frequency components need to be protected because filtering can protect either the download or upload portion of the 2.6 GHz band from the 2.4 GHz ISM band. Generally, the WiMAX transceiver will be in a sleep state a majority of the time in the short term due to the high transmission rate of the IEEE 802.16 specification and therefore delaying the Bluetooth timeslots will not overly hamper the quality of the link when WiMAX is transmitting or receiving.

Figure 1:
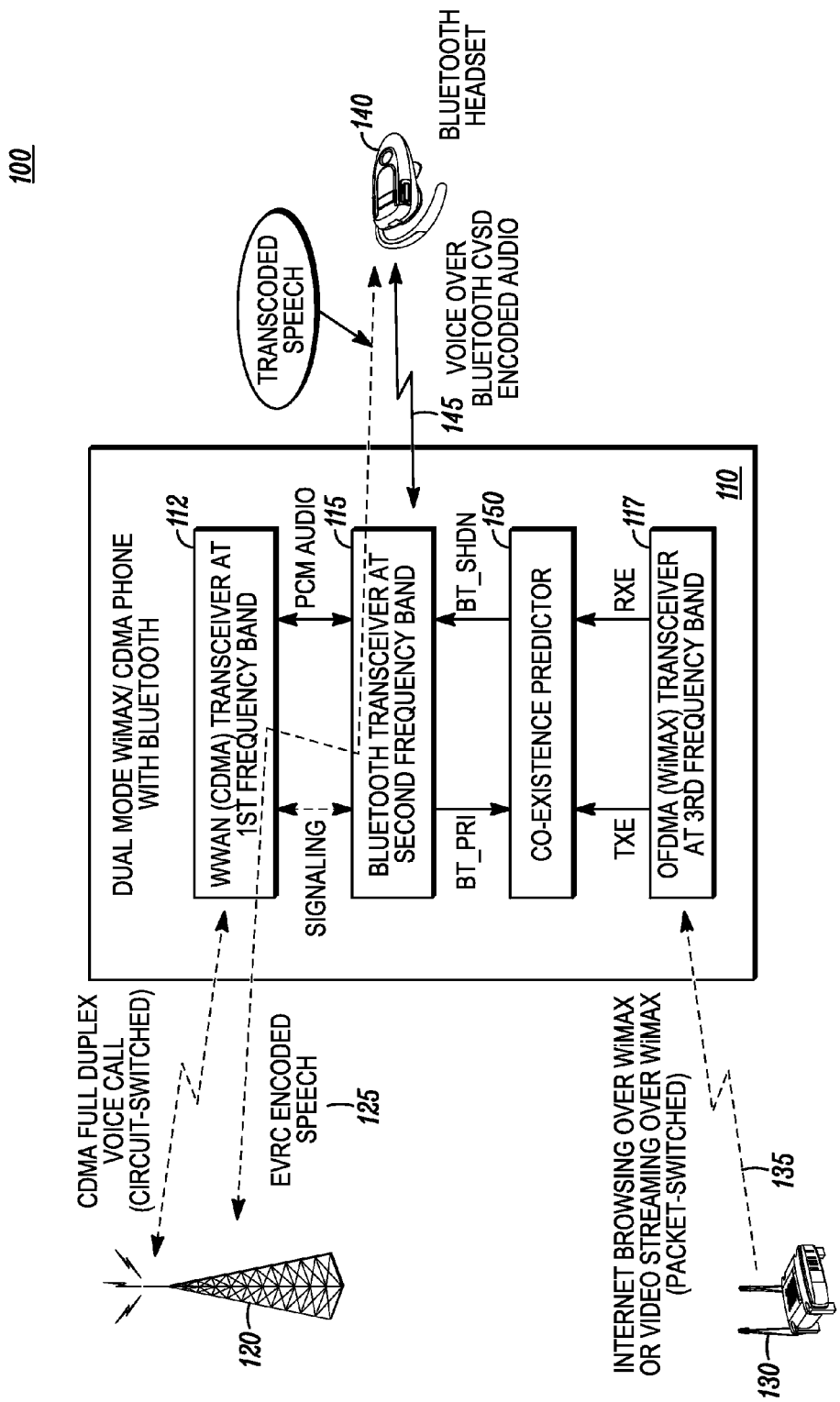
FIG. 1 illustrates a sample usage scenario for a dual-mode wireless communication device.

FIG. 1 illustrates a sample usage scenario 100 for a dual-mode wireless communication device 110 with a co-existence predictor 150. The wireless communication device can also be referred to as a mobile station, a mobile device, user equipment, wireless terminal unit, and the like. The wireless communication device may take the form of a cellular telephone with wireless data connection, a laptop computer with wireless data connection, a personal digital assistant (PDA), and other types of portable communication devices. The wireless communication device 110 in this example has a Wireless Wide Area Network (WWAN) radio transceiver 112 operating at a first frequency band, a Bluetooth Wireless Personal Area Network (WPAN) radio transceiver 115 operating at a second frequency band, and an OFDMA radio transceiver 117 operating at a third frequency band. In this example, the WWAN radio transceiver 112 is implemented as a Code Division Multiple Access (CDMA) user equipment transceiver operating at 1900 MHz; although the WWAN radio could alternately be Wideband-CDMA (W-CDMA), CDMA2000, Global System for Mobile Communications (GSM), Time Division Multiple Access (TDMA), or other protocols operating at other frequency bands.

The CDMA radio transceiver 112 of the device 110 uses a first wireless communication link 125 at 1900 MHz to communicate with a CDMA base station 120. This example presumes that the first communication link 125 handles a full-duplex voice call (circuit-switched connection) including speech encoded with Enhanced Variable Rate Codec (EVRC) technology. The speech is transcoded with Continuous Variable Slope Delta (CVSD) modulation to be sent using the Bluetooth transceiver 115 over a second wireless communication link 145 at 2.4 GHz to the Bluetooth headset 140. Bluetooth uses Synchronous Connection Oriented (SCO) links for voice data where timeslots are fixed and packets are not re-transmitted and Asynchronous Logical Transports (ACL) for maintaining service level connections between devices.

In this example, the OFDMA transceiver 117 is an IEEE 802.16e transceiver operating at 2.5 GHz, which will require co-existence with the Bluetooth transceiver 115 operating at 2.4 GHz. Note that the OFDMA transceiver 117 could alternately be implemented as a UTRA-UTRAN Longer Term Evolution (LTE) transceiver based on either GSM or CDMA technology, a Multiband OFDM Alliance (MBOA) ultra-wide band (UWB) transceiver, or any other OFDMA synchronous framing system operating in the same or adjacent band as the Bluetooth transceiver. If a user of the device 110 is Internet browsing or video streaming using the OFDMA transceiver 117 over a third wireless communication link 135 at 2.5 GHz to an access point 130 (sometimes referred to as a base station), the Bluetooth transceiver 115 will be controlled through a Bluetooth shutdown signal 190 to reduce internal interference, receiver de-sense, and packet collisions caused by co-located OFDMA transmissions.

Variations of this sample usage scenario 100 may exclude the WWAN first communication link 125 at 1900 MHz, because it is not a cause of interference at the second and third frequency bands (2.4-2.5 GHz). For example, if a user had a video streaming third wireless communication link 135 at 2.5 GHz and was listening to the stereo audio portion retransmitted over the Bluetooth second wireless communication link 145 at 2.4 GHz, this would require co-existence. Also, if a user had a Voice over Internet Protocol (VoIP) third wireless communication link 135 at 2.5 GHz and was listening to the voice using the Bluetooth headset, this too would also require co-existence.

By using a Bluetooth shutdown signal 190 to turn off the synchronous frame-based transmitter, the device 110 can protect the receiver of a Bluetooth transceiver 115 from internal (or nearby) interference when an OFDMA signal is expected to be transmitted. When no OFDMA signal is expected to be transmitted, the Bluetooth transmitter can be controlled depending on the relative importance of any Bluetooth signal to be transmitted and any OFDMA signal to be received. Before explaining the Bluetooth shutdown signal 190 in detail, the format of OFDMA frames will be described.

An OFDMA transceiver 117 can operate in either a frequency division duplex (FDD) mode or a time division duplex (TDD) mode. For FDD systems, only one of the OFDMA downlink or uplink needs to be considered, because filtering can protect the portion of the band (downlink or uplink) that is further away from the ISM band.

Figure 2:
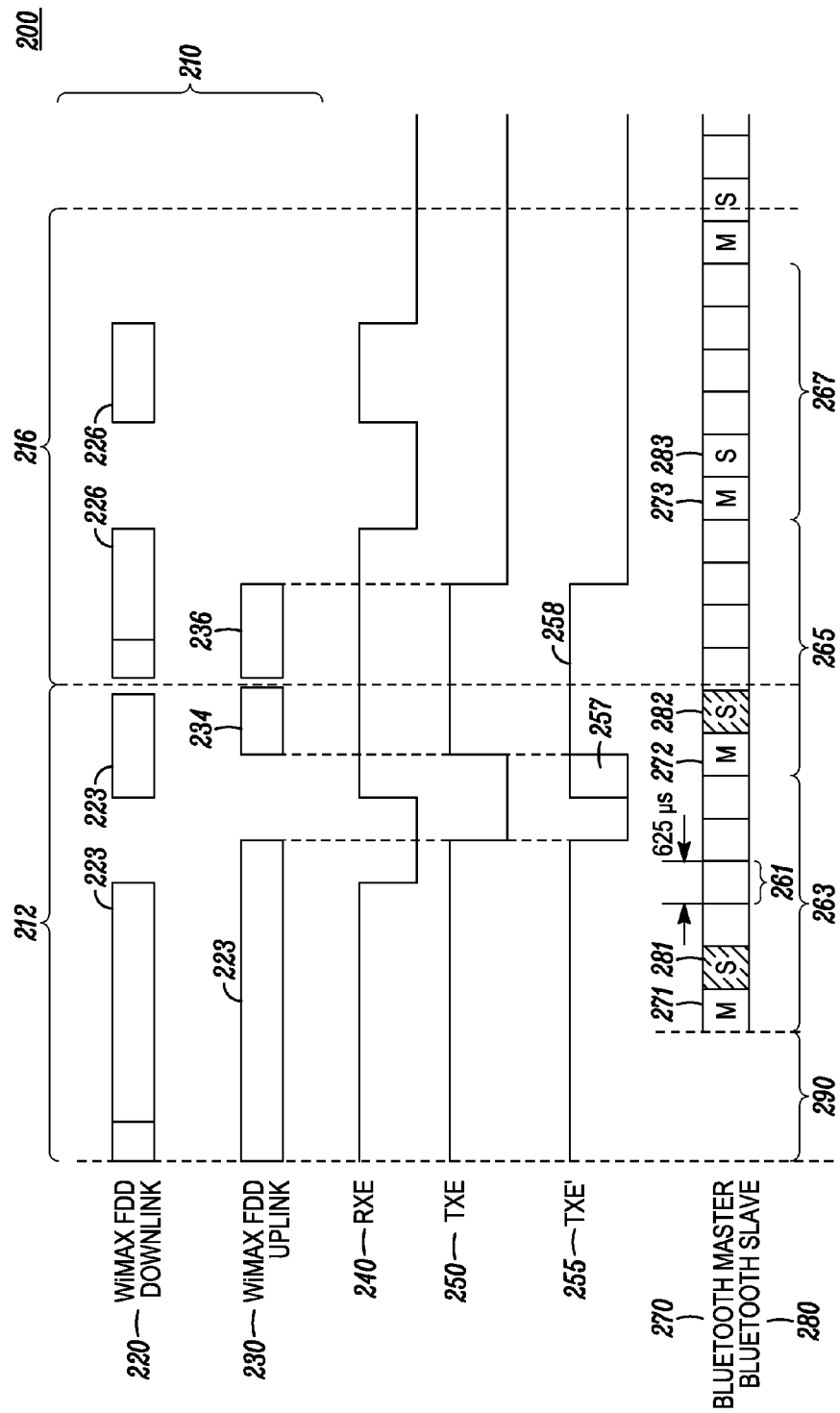
FIG. 2 illustrates an example of a WiMAX FDD communication link operating concurrently with a Bluetooth communication link.

FIG. 2 illustrates an example 200 of a WiMAX FDD communication link 210 operating concurrently with a Bluetooth communication link 260. This example could occur in the scenario shown in FIG. 1 when the third communication link 135 is active using WiMAX FDD mode at 2.6 GHz and the second communication link 145 is active using a Bluetooth connection at 2.4 GHz. According to the IEEE 802.16 Standard, WiMAX FDD frames 213, 216 are 5 ms long. In a WiMAX or other FDD system, downlink reception 220 and uplink transmission 230 occur using separate frequencies within the main frequency band. Thus, downlink reception 220 and uplink transmission 230 can occur simultaneously within a WiMAX FDD system. This scenario assumes that the downlink frequency is further from the ISM band.

Meanwhile, a Bluetooth connection uses Bluetooth frames 263, 265, 267 that have six Bluetooth timeslots 261 of 625 microseconds in duration. Also Bluetooth devices are either a master device 270 or a slave device 280. A slave device 280 is only allowed to transmit in response to receiving a transmission from a master device 270, and the slave device 280 must respond in the Bluetooth timeslot directly after the master device transmits.

In this example 200, a Bluetooth master device 270 (such as Bluetooth transceiver 115 shown in FIG. 1) transmits during a first Bluetooth timeslot 271 and the Bluetooth slave device 280 (such as Bluetooth headset 140 shown in FIG. 1) responds in the next Bluetooth timeslot 281. Meanwhile, through, a WiMAX transmitter (such as the transmitter portion of WiMAX transceiver 117 shown in FIG. 1) transmits 233, 234 during a portion of a first WiMAX FDD frame 213 as reflected in a transmit-enable (TXE) signal 250. A WiMAX receiver (such as the receiver portion of WiMAX transceiver 117 shown in FIG. 1) receives 223 during part of the first WiMAX FDD frame 213 as reflected in a receive-enable (RXE) signal 240. The TXE signal 250 and the RXE signal 240 are digital, and the RXE signal is ON when the WiMAX transceiver is receiving and is OFF otherwise. Similarly, the TXE signal is ON when the WiMAX transceiver is transmitting and is OFF otherwise.

As shown, the WiMAX transmission 233 during the first WiMAX FDD frame 213 may severely interfere with the concurrent Bluetooth slave device 280 transmission during Bluetooth timeslot 281, and the packet sent during Bluetooth timeslot 281 will likely be lost.

Continuing to the second Bluetooth frame 265, the master device 270 transmits during a first Bluetooth timeslot 272 and the Bluetooth slave device 280 responds in the next Bluetooth timeslot 282. But the WiMAX FDD transmitter is transmitting 234 during that portion of the first FDD frame 213 and thus this second Bluetooth packet transmitted from the slave device 280 will probably also be lost.

In the third Bluetooth frame 267, the master device 270 transmits during a first Bluetooth timeslot 273 and the Bluetooth slave device 280 responds in the next Bluetooth timeslot 283. Because the WiMAX FDD uplink transmitter 230 is not active while the Bluetooth slave device is transmitting during timeslot 283, the Bluetooth packet may be received without co-existence interference. Note that, in this example, it is assumed that the WiMAX FDD downlink 220 reception 223, 226 does not affect the Bluetooth transceiver due to low signal strength from the signal source (such as the access point 130 shown in FIG. 1) and/or an ability for the Bluetooth master to filter out the signals received at the WiMAX FDD downlink frequency.

Note that there is an offset 290 between the start of a WiMAX frame 213 and the start of a first Bluetooth frame 263. This offset 290 is shown as being positive (in that the Bluetooth signaling starts after the WiMAX signaling starts) but could easily be negative (i.e., the WiMAX signaling starts after the Bluetooth signaling starts).

By noting any periodicity in the TXE signal 250, a co-existence predictor (see co-existence predictor 150 shown in FIG. 1) can create a predictive transmit-enable (TXE') signal 255. This TXE' signal can be used to schedule Bluetooth master transmissions such that Bluetooth slave responses are less likely to suffer from co-existence issues. Assuming that at least a portion of the TXE signal 250 pattern is repetitive, the TXE' signal 255 can be predicted and be used to control the Bluetooth transceiver to avoid co-existence interference. By modifying the TXE' signal 255 to turn ON early 257 in situations where the slave device's response would overlap with an expected OFDMA transmission, a modified TXE' signal can be used to control the Bluetooth transmitter to avoid OFDMA interference when a Bluetooth slave device's response is expected. Using the modified TXE' signal to shut down the Bluetooth transmitter forces the Bluetooth master device to transmit at a next available timeslot 273 and receive in the following timeslot 283 without co-existence interference.

Thus, without a solution to the co-existence problem (such as the co-existence predictor 150 shown in FIG. 1), two Bluetooth slave packets would be lost in this example. A co-existence predictor, however, would use a modified TXE' signal to prevent the Bluetooth master device 270 from transmitting during timeslots 271, 272, which in turn would prevent the Bluetooth slave device 280 from transmitting during timeslots 281, 282. Delaying transmission by the Bluetooth master device 270 to a timeslot (such as timeslot 273) when the Bluetooth slave may respond without much risk of interference (such as timeslot 283) benefits co-existence. A minor delay of several Bluetooth timeslots or Bluetooth frames may be considered an adequate trade-off for loss of Bluetooth packets.

Figure 3:
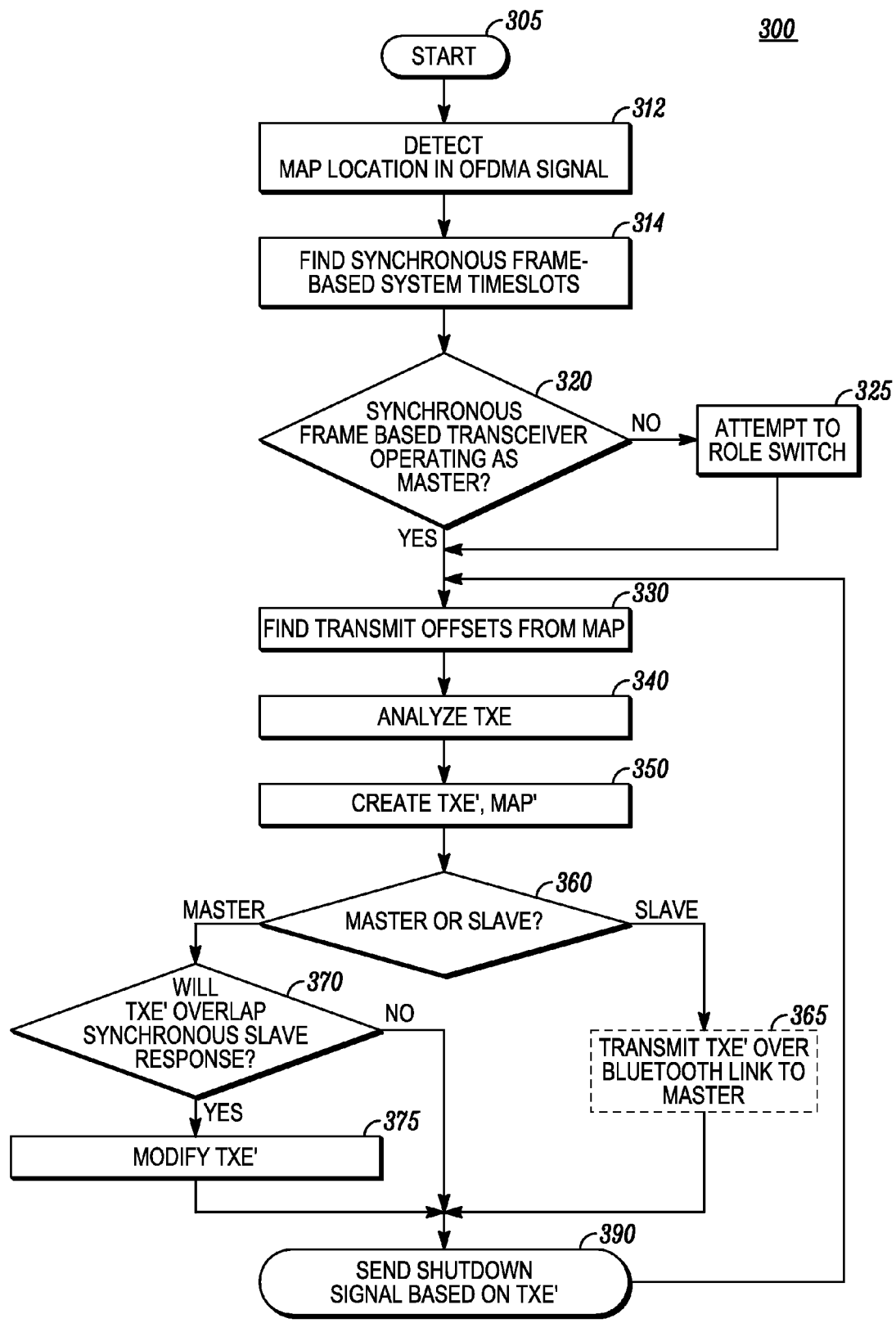
FIG. 3 is a flow diagram of a method for co-existence between an Orthogonal Frequency Division Multiple Access (OFDMA) FDD system and a synchronous frame-based system in accordance with an embodiment.

FIG. 3 is a flow diagram 300 of a method for co-existence between an Orthogonal Frequency Division Multiple Access (OFDMA) FDD system and a synchronous frame-based system in accordance with an embodiment. If the OFDMA transceiver 117 is operating in an FDD mode as illustrated in FIG. 2, this flow diagram provides an example of a method to predict co-existence issues and shut down the Bluetooth transmitter during time periods when co-existence will cause internal interference, receiver de-sense, and packet collisions. The method may be implemented in a co-existence predictor (such as the co-existence predictor 150 shown in FIG. 1.)

The flow diagram begins 305 when an OFDMA transceiver (such as WiMAX transceiver 117 shown in FIG. 1) is operating in FDD mode and a synchronous frame-based transceiver (such as Bluetooth transceiver 115 shown in FIG. 1) is operating simultaneously. Although the example presumes that the two transceivers are housed in a dual-mode wireless communication device (such as device 110 shown in FIG. 1), the flow diagram 300 is also applicable to situations where the OFDMA FDD transceiver and the Bluetooth transceiver are operating in separate devices that are in close proximity to each other.

The co-existence predictor detects 312 a location of a Media Access Protocol (MAP) region in a received OFDMA signal. The MAP region contains details of the time and frequency slots at which the WiMAX transceiver is allowed to operate. The MAP region occurs at the beginning of each downlink frame and is of importance because proper reception of a MAP instructs the device when (and at which frequencies) data can be sent and received. MAP detection may be implemented in a number of ways, such as using transition analysis of a WiMAX receive-enable (RXE) signal, using Fast Fourier Transform (FFT) technique to analyze a WiMAX RXE signal, a delay-locked loop, and/or using covariance methods for finding MAP symbols within an RXE signal.

Also, the co-existence predictor finds 314 the boundaries of synchronous frame-based timeslots for the Bluetooth transceiver. Note that the clock for a synchronous frame-based system is not likely to be aligned with the clock for an OFDMA system. When a Bluetooth transmission occurs, a time can be started to track the 625 microsecond Bluetooth timeslots. Note that steps 312, 314 can be performed in any order or concurrently.

Step 320 determines if the Bluetooth transceiver is operating as a master device. Master and slave status can be determined in a number of ways. For example, the device may be programmed to always perform a role switch to master device upon first connecting with another Bluetooth device. Alternately, the device could be programmed to reject Bluetooth connection requests and always initiate connections with other Bluetooth devices. As another example, the device can write its status (either master or slave) to memory. As a third example, if it is observed that a Bluetooth reception always follows a Bluetooth transmission and never occurs apart from a Bluetooth transmission, then the device concludes that it is the master device in the Bluetooth communication link; otherwise the device concludes it is a slave device in the Bluetooth communication link. If the Bluetooth transceiver is not operating as a master device, the co-existence predictor instructs the Bluetooth transceiver to attempt 325 to switch the role of the Bluetooth transceiver from a slave device to a master device Regardless of whether the role switch is successful, the co-existence predictor next finds 330 a transmit offset (see offset 290 shown in FIG. 2) between the MAP and the Bluetooth timeslots previously detected 312 and found 314. When a Bluetooth transmission occurs, a timer can be started to track the 625 microsecond Bluetooth timeslots. The device knows that if it is a master device, then the slave device must respond in the next timeslot immediately following a master device's transmission. This information will be useful for determining whether a Bluetooth slave device's response might suffer co-existence issues due to a simultaneous transmission by a co-located ODFMA transceiver, which will be described later in the flow diagram 300.

Next, the co-existence predictor analyzes 340 the transmit-enable (TXE) signal from the OFDMA transceiver. For an FDD system, the co-existence predictor can simply observe the pattern of ON/OFF values for the TXE signal and collect timing data from observing the TXE signal. In the example shown in FIG. 2, the TXE signal 250 does not show a repetitive pattern, but further observations would show that the TXE signal 250 repeats itself at 10 millisecond (two WiMAX frames) intervals. Many applications that use OFDMA transceivers show loosely periodic signal patterns. For example, multimedia streaming and VoIP communications have recognizably repetitious transmission patterns. The same techniques employed to find a periodic MAP region can be used to locate periodicity in the TXE signal 250. These techniques including using a microcontroller unit, a Fast Fourier Transform, a delay-locked loop, and/or covariance methods.

Based on the analyses, a future transmit-enable (TXE') signal is created 350, which extrapolates from the past TXE signal to predict future OFDMA transmission times. Continuing the example from FIG. 2, the TXE' signal would continue the two-WiMAX-frame pattern. This flow diagram 300 is not concerned with the RXE signals (or a future receive-enable RXE' signal) because filtering can allow the Bluetooth transceiver to eliminate signals on the receive frequency band in an FDD system.

If the Bluetooth transceiver is currently a master device as determined in step 360, step 370 determines if the predicted future transmit-enable signal (TXE') will overlap with a Bluetooth slave device's response to the master device's signal. The determination 370 can use the transmit offset found 330 earlier. If an overlap is predicted, which indicates that interference will likely destroy Bluetooth reception, the TXE' signal is modified 375 to turn ON at least one Bluetooth timeslot early such that the master device will not transmit during the modified TXE' signal and consequently prevent the slave device from transmitting into a co-existence interference situation. By delaying the master device's transmission, the slave device's response may avoid being lost to co-located interference. Returning to the example in FIG. 2, if the Bluetooth master device 270 transmission on timeslot 272 was delayed by six timeslots to timeslot 273 due to the modified TXE' signal 255 turning ON early 257 by at least 625 microseconds, the Bluetooth slave device 280 response on timeslot 283 would not experience co-existence issues. Note that the modification could be accomplished by shifting the existing pulse 258 ahead in time by at least 625 microseconds or by adding a high signal of at least 625 microseconds in duration prior to the existing pulse 258.

Optionally, if step 360 determines that the Bluetooth is a slave device, the predicted transmit-enable (TXE') signal can be transmitted 365 over the Bluetooth link to the master device, and the master device can use the TXE' signal information to adjust its transmissions so as to avoid interference when the slave device responds.

If step 360 determines that the Bluetooth is a slave device, or step 370 determines that the TXE' signal will not overlap with a Bluetooth slave's response signal, or the offset has been added 375 to the TXE' signal to produce a modified TXE' signal, then the flow diagram proceeds to send 390 a shut down signal to the synchronous frame-based transceiver based on the TXE' signal (as modified, if applicable).

By using past signals TXE to predict future signals TXE' and then analyzing the predicted signals to determine potential time periods of co-existence, the flow diagram 300 can shut down a synchronous frame-based transmitter so that the effects of co-existence on Bluetooth reception are minimized. When the synchronous frame-based transmitter is re-enabled, the transmitter resumes with a slight delay. Thus, instead of losing Bluetooth packets due to co-existence, these packets are merely delayed.

Figure 4:
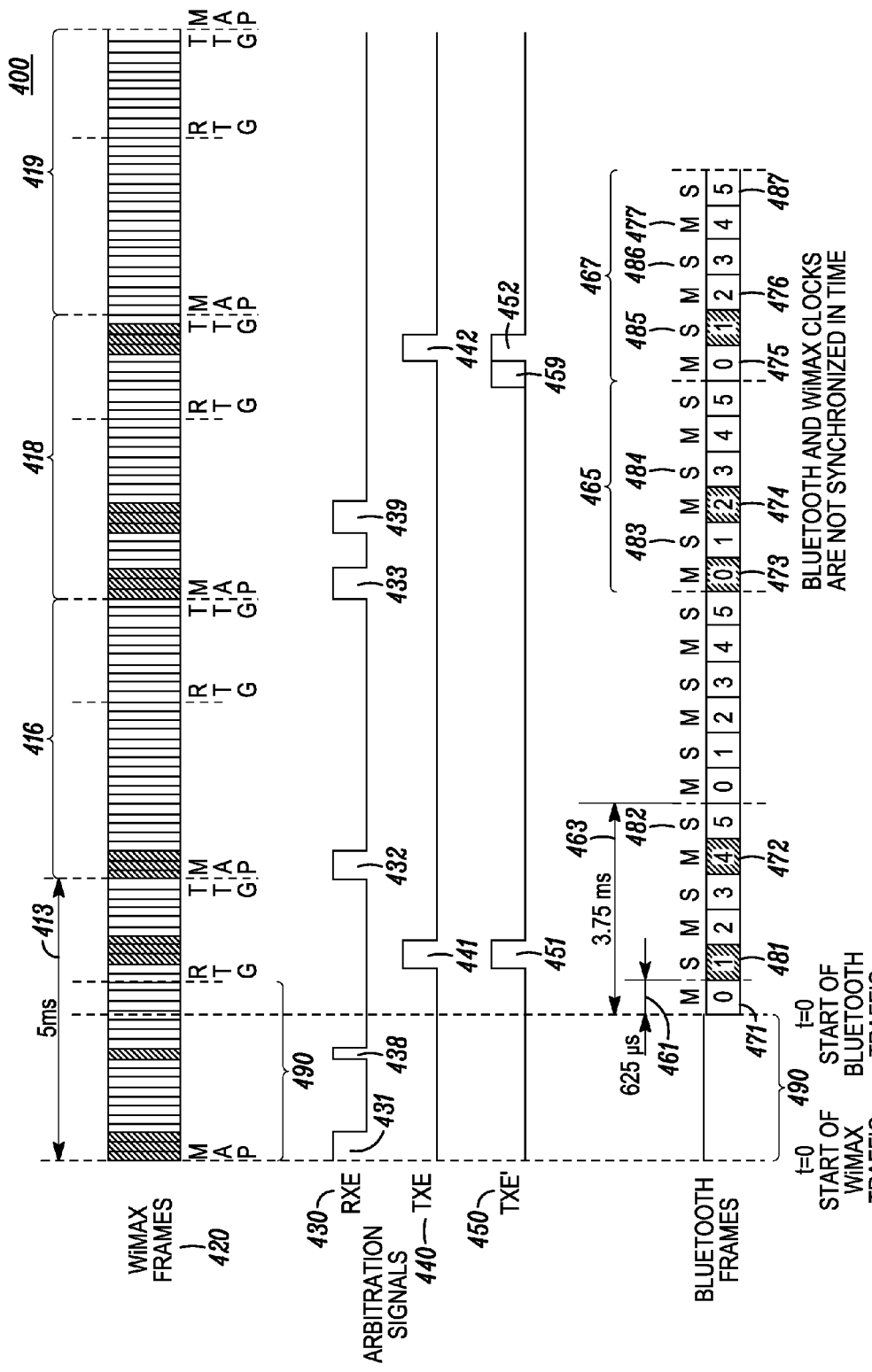
FIG. 4 illustrates a sample segment of a TDD signal operating concurrently with a Bluetooth signal.

FIG. 4 illustrates a sample 400 segment of a WiMAX TDD communication link 420 operating concurrently with a Bluetooth communication link 470. This example could occur in the scenario shown in FIG. 1 when the third communication link 135 is active using WiMAX TDD mode at 2.6 GHz and the second communication link 145 is active using a Bluetooth connection at 2.4 GHz. According to the IEEE 802.16 Standard, WiMAX TDD frames 413, 416 are 5 ms long. In a WiMAX or other TDD system, downlink reception and uplink transmission occur using the same set of frequencies and thus downlink reception and uplink transmission cannot occur simultaneously within a WiMAX TDD system. Generally, in a WiMAX system, a WiMAX TDD frame starts with a downlink portion and ends with an uplink portion. The downlink portion includes a media access protocol (MAP) signal followed by downlink data. Each device should receive the MAP signal, which then instructs the device when (and at which frequencies) to look for downlink data signals and when (and at which frequencies) to transmit uplink data signals.

Note that there is a time offset 490 between the start of a first WiMAX frame 413 and the start of a first Bluetooth frame 463. This offset 490 is shown as being positive (in that the Bluetooth signaling starts after the WiMAX signaling starts) but could easily be negative (i.e., the WiMAX signaling starts after the Bluetooth signaling starts).

WiMAX arbitration RXE signal 430 enables the WiMAX receiver to receive OFDMA signals and WiMAX arbitration TXE signal 440 enables the transmitter to transmit OFDMA signals. There tends to be a regular pattern 431, 432, 433 to the RXE signal 430 due to the MAP structure at the beginning of each WiMAX frame. Additional reception times 438, 439 are intermittent and augment the regular pattern 431, 432, 433. The TXE signal 440 tends to be enabled 441, 442 during the latter portion of a WiMAX frame. In many situations, such as VoIP traffic with consistent uplink data and downloading data, or streaming media traffic that has consistent acknowledgements from the mobile device, the TXE signal is pseudo periodic. For example, although only four WiMAX frames 413, 416, 418, 419 are shown, it is possible that further WiMAX frames could exhibit an "every-other-frame" TXE signal such that pulses 441, 442 repeat on a semi-consistent basis. Extrapolating the periodic portions of the TXE signal 440 results in a predicted transmit-enable (TXE') signal 450 that replicate the semi-consistent pulses 451, 452.

Meanwhile, a Bluetooth connection uses Bluetooth frames 463, 465, 467 that have six Bluetooth timeslots 461 of 625 microseconds in duration. Bluetooth devices are either a master device or a slave device. In this diagram, the master device transmits on timeslots 0, 2, 4 (designated by an "M") within each Bluetooth frame 463, 465, 467 and the slave device transmits on timeslots 1, 3, 5 (designated by an "S") within each Bluetooth frame 463, 465, 467. A slave device is only allowed to transmit in response to receiving a transmission from a master device, and the slave device must respond in the Bluetooth timeslot directly after the master device transmits.

As shown in FIG. 4, a Bluetooth master device (such as Bluetooth transceiver 115 shown in FIG. 1) transmits during a first Bluetooth timeslot 471 and the Bluetooth slave device (such as Bluetooth headset 140 shown in FIG. 1) responds in the next Bluetooth timeslot 481. Meanwhile, through a WiMAX transmitter (such as the transmitter portion of WiMAX transceiver 117 shown in FIG. 1) transmits 441 during a portion of a first WiMAX TDD frame 413. As shown, the WiMAX transmission 441 during the first WiMAX TDD frame 413 may severely interfere with the concurrent Bluetooth slave transmission during Bluetooth timeslot 481 and a Bluetooth packet sent during the Bluetooth timeslot 481 will probably not be received.

Later in the same Bluetooth frame 463, the master device transmits during a fifth Bluetooth timeslot 472 and the slave device transmits during a sixth Bluetooth timeslot 482. If the WiMAX RXE signal pattern 432 is directing the WiMAX transceiver to receive, then the nearby Bluetooth transmission may overpower the WiMAX signal reception. In this situation, the MAP portion of the second WiMAX TDD frame 416 may not be received, which may result in not receiving any signals properly for that WiMAX TDD frame 416.

Continuing to another Bluetooth frame 465, the master device transmits during a first Bluetooth timeslot 473 and again during a third Bluetooth timeslot 474. The Bluetooth slave would respond by transmitting on the second Bluetooth timeslot 483 and the fourth Bluetooth timeslot 484. Similar to the previous situation, if the WiMAX RXE signal pattern 433, 439 is directing the WiMAX transceiver to receive, then the nearby Bluetooth transmission may overpower the WiMAX signal reception. In this situation, the MAP portion of the third WiMAX TDD frame 418 may not be received, which may result in not receiving any signals properly for that WiMAX TDD frame 418. Also, the master device transmission during the third Bluetooth timeslot 474 may interfere with non-MAP WiMAX TDD receptions.

During the next Bluetooth frame 467, a master device transmitting during the first Bluetooth timeslot 475 might not experience co-existence interference with a WiMAX transmission. But the response from the slave device during the next Bluetooth timeslot 485 will experience co-existence interference due to the concurrent WiMAX transmission indicated by pulse 442. If the master device delayed the transmission from Bluetooth timeslot 475 to Bluetooth timeslot 476 or Bluetooth timeslot 477, the slave response at either Bluetooth timeslot 485 or Bluetooth timeslot 487 would be free of co-existence interference. In order to delay the transmission from Bluetooth timeslot 475 to Bluetooth timeslot 476, the TXE' signal 450 is modified to turn ON early 459 by at least 625 microseconds (the equivalent of one Bluetooth timeslot) or modified to shift the existing pulse 452 ahead in time by at least 625 microseconds. By sending a modified TXE' signal 450 to control shut down of the Bluetooth transmitter, the Bluetooth transmitter cannot transmit during Bluetooth timeslot 475 and subsequently no Bluetooth reception on Bluetooth timeslot 485 will experience co-existence issues. The next opportunity to transmit will be during Bluetooth timeslot 476 and the response from the slave device at Bluetooth timeslot 486 will not experience any predicted OFDMA co-existence issues.

Figure 5:
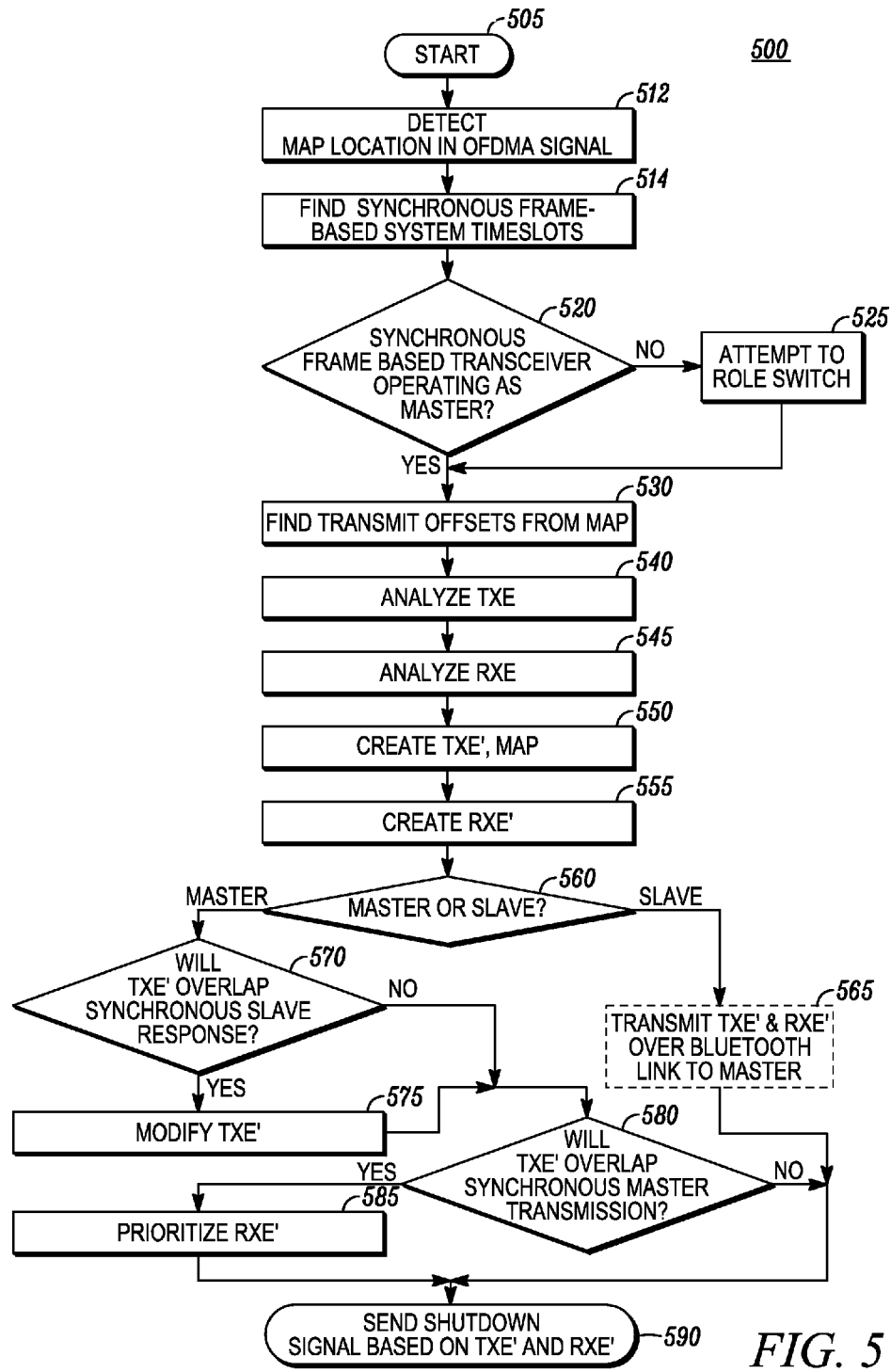
FIG. 5 is a flow diagram of a method for co-existence between an Orthogonal Frequency Division Multiple Access (OFDMA) TDD system and a synchronous frame-based system in accordance with another embodiment.

FIG. 5 is a flow diagram 500 of a method for co-existence between an Orthogonal Frequency Division Multiple Access (OFDMA) TDD system and a synchronous frame-based system in accordance with another embodiment. The method may be implemented in a co-existence predictor (such as the co-existence predictor 150 shown in FIG. 1.) The flow diagram begins 505 when an OFDMA transceiver (such as WiMAX transceiver 117 shown in FIG. 1) is operating in TDD mode and a synchronous frame-based transceiver (such as Bluetooth transceiver 115 shown in FIG. 1) is operating simultaneously. Although the example presumes that the two transceivers are housed in a dual-mode wireless communication device (such as device 110 shown in FIG. 1), the flow diagram 500 is also applicable to situations where the OFDMA TDD transceiver and the Bluetooth transceiver are operating in separate devices that are in close proximity to each other.

The co-existence predictor detects 512 a location of a MAP in an OFDMA signal. Detection may be implemented in a number of ways, such as using transition analysis of a WiMAX receive-enable (RXE) signal, using Fast Fourier Transform (FFT) technique to analyze a WiMAX RXE signal, and/or using covariance methods for finding MAP symbols within an RXE signal. Also, the co-existence predictor finds 514 the boundaries of synchronous frame-based timeslots for the Bluetooth transceiver. Note that steps 512, 514 can be performed in any order or concurrently.

Also, step 520 determines if the Bluetooth transceiver is operating as a master device. Master and slave status can be determined in a number of ways. For example, the device may be programmed to always perform a role switch to master device upon first connecting with another Bluetooth device. Alternately, the device would be programmed to reject Bluetooth connection requests and always initiate connections with other Bluetooth devices. Also, if it is observed that a Bluetooth reception always follows a Bluetooth transmission and never occurs apart from a Bluetooth transmission, then the device concludes that it is the master device in the Bluetooth communication link; otherwise the device concludes it is a slave device in the Bluetooth communication link. If the Bluetooth transceiver is not operating as a master device, the co-existence predictor instructions the Bluetooth transceiver to attempt 525 to switch the role of the Bluetooth transceiver from a slave device to a master device.

Regardless of whether the role switch is successful, the co-existence predictor next finds 530 a transmit offset (see offset 490 shown in FIG. 4) between the MAP and the Bluetooth timeslots previously detected 512 and found 514. When a Bluetooth transmission occurs, a timer can be started to track the 625 microsecond Bluetooth timeslots. The device knows that if it is a master device, then the slave device must respond in the next timeslot immediately following a master device's transmission. This information will be useful for determining whether a Bluetooth slave device's response might suffer co-existence issues due to a simultaneous transmission by a co-located ODFMA transceiver, which will be described later in the flow diagram 500.

Next, the co-existence predictor analyzes 540 the transmit-enable (TXE) signal from the OFDMA transceiver. The co-existence predictor also analyzes 545 the receive-enable (RXE) signal from the OFDMA transceiver. These two analyses 540, 545 can occur in any order (including concurrently). Based on the analyses 540, 545, an estimate of future transmit-enable (TXE') and future MAP (MAP') signals is created 550. Also, an estimate of a future receive-enable (RXE') signal is created 555. These three future estimated signals can be created in any order, including concurrently.

If the Bluetooth transceiver is currently a master device as determined in step 560, step 570 determines if the predicted future transmit-enable signal (TXE') will overlap with a Bluetooth slave device's response to the master device's signal. The determination 570 can use the transmit offset found 530 earlier. If an overlap is predicted, which indicates that interference will likely destroy Bluetooth reception, the TXE' signal is modified 575 to turn ON at least one Bluetooth timeslot early such that the master device will not transmit during the modified TXE' signal and consequently prevent the slave device from transmitting into a co-existence interference situation. By delaying the master device's transmission, the slave device's response may avoid being lost to co-located interference. Returning to the example in FIG. 4, if the Bluetooth master device transmission on Bluetooth timeslot 475 was delayed by two Bluetooth timeslots to Bluetooth timeslot 476 due to the modified TXE' signal 450 turning ON early 459 by at least 625 microseconds, the Bluetooth slave device response on Bluetooth timeslot 486 would not experience co-existence issues.

Optionally, if step 560 determines that the Bluetooth is a slave device, the predicted transmit-enable (TXE') signal and predicted receive-enable (RXE') signal can be transmitted 565 over the Bluetooth link to the master device, and the master device can use the TXE' signal information to adjust its transmissions so as to avoid interference when the slave device responds.

Regardless of whether the TXE' signal overlaps with a Bluetooth slave device's response, step 580 determines if the predicted future receive-enable signal (RXE') will overlap with a Bluetooth master device's signal. If an overlap is predicted, which indicates that interference will likely result, step 585 prioritizes the RXE' signal such that the RXE' signal is incorporated into the signaling to shut down the Bluetooth transceiver.

If step 560 determines that the Bluetooth is a slave device, or step 580 determines that the RXE' signal will not overlap with a Bluetooth slave's response signal, or the offset has been added 585 to the RXE' signal, then the flow diagram proceeds to send 590 a shut down signal to the synchronous frame-based transceiver based on the TXE' signal (as modified, if applicable) and the RXE' signal (if applicable).

By using past signals MAP, RXE, and TXE to predict future signals MAP', RXE', and TXE' and then analyzing the future signals to predict potential time periods of co-existence, the flow diagram can shut down a synchronous frame-based transmitter so that the effects of co-existence are minimized. Using the TXE' signal to shut down the synchronous frame-based transmitter protects signals to be received at synchronous frame-based transceiver. Using the RXE' and/or MAP' signal to shut down the synchronous frame-based transmitter protects signals to be received at the OFMDA receiver. When the synchronous frame-based transmitter is enabled, the transmitter resumes with a slight delay. Thus, instead of losing Bluetooth signals due to co-located interference, these signals are delayed.

Figure 6:
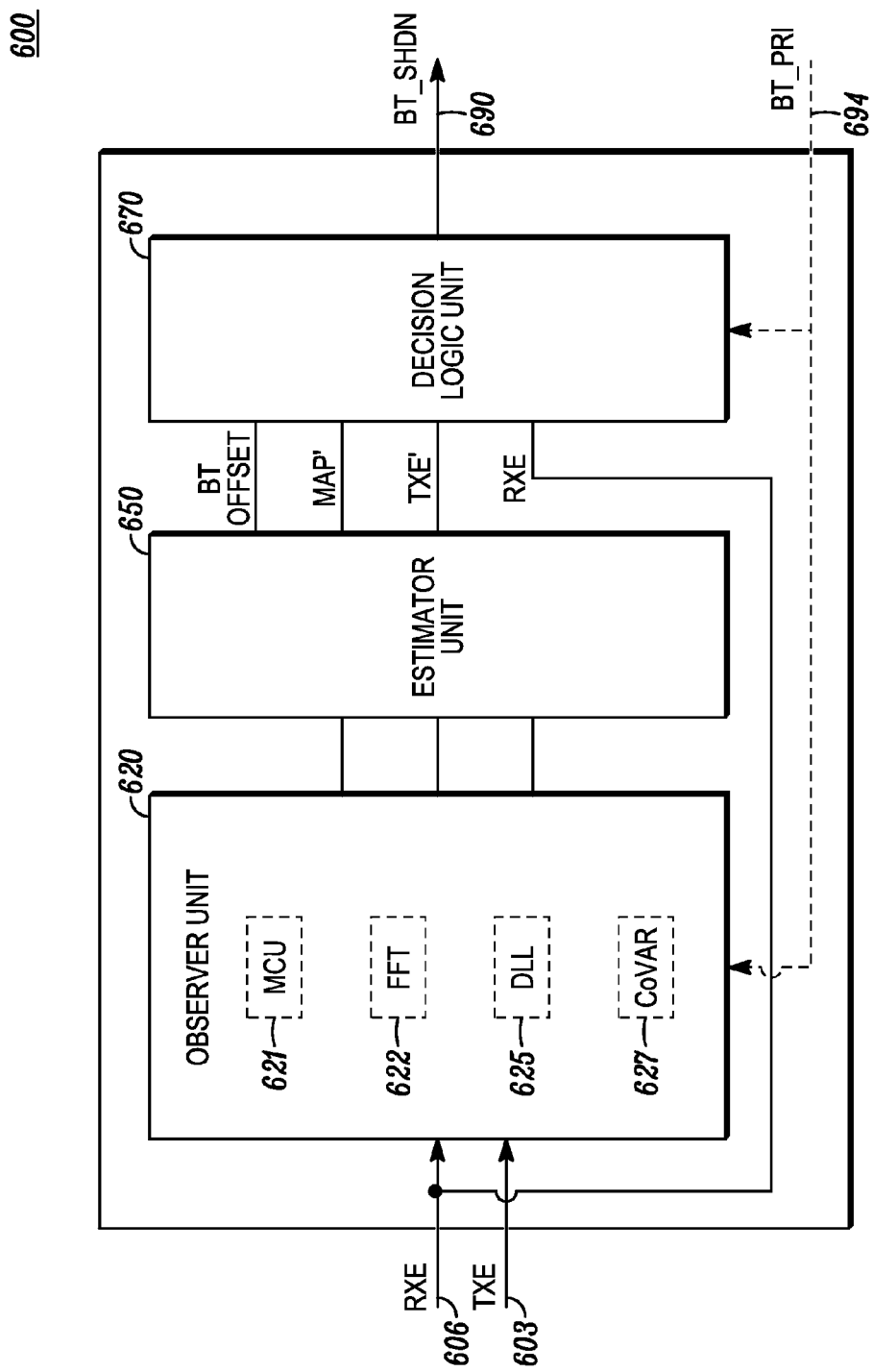
FIG. 6 is a block diagram of a co-existence predictor in accordance with an embodiment.

FIG. 6 is a block diagram of a co-existence predictor 600 in accordance with an embodiment. The co-existence predictor can be implemented as the co-existence predictor 150 shown in FIG. 1 and can create the Bluetooth shut down (BT-SHDN) signal based on predicted OFDMA transmission (TXE') signals and/or predicted OFDMA transmission (RXE') signals.

The co-existence predictor 600 uses a TXE signal (such as TXE signal 250 shown in FIG. 2 or TXE signal 440 shown in FIG. 4) of an OFDMA transceiver (such as OFDMA transceiver 117 shown in FIG. 1) to predict a future transmit-enable (TXE') signal. The TXE' signal is optionally modified and is used to shut down a synchronous frame-based transceiver (such as Bluetooth transceiver 115 shown in FIG. 1) during specified periods in order to reduce co-existence issues by preventing Bluetooth reception during time periods where co-located OFDMA transmissions are expected.

The co-existence predictor 600 includes an observer unit 620, an estimator unit 650, and a decision logic unit (DLU) 670. The observer unit 620 monitors the TXE signal 603 from a co-existent OFDMA transceiver (e.g., TXE signal 250 or TXE signal 440) and analyzes its periodicity (frequency and phase) and pulse duration looking for repeated patterns. Because multimedia streaming and most VoIP communications have recognizably repetitious transmission patterns, the TXE signal will be pseudo periodic.

The estimator 650 takes the historical TXE information from the observer unit 620 and generates a predicted transmit-enable (TXE') signal representing the expected location-in-time of future OFDMA transmissions. The decision logic unit 670 generates a BT_SHDN signal 690 based on the TXE' signal and a BT_PRI signal 694 that indicates when a Bluetooth priority packet will be transmitted.

The observer unit 620 can include one or more components user to extract periodicity information from a TXE signal 603. A microcontroller unit 621, a Fast Fourier Transform block 622, a delay-locked loop 625, and/or a covariance block 627 can be used to find the frequency, phase, and duration of repetitive elements of a TXE signal. These same observer unit 620 components can be re-used to find the frequency, phase, and duration of a MAP symbol from an RXE signal 606 (such as RXE signal 430 shown in FIG. 4) to establish a predicted RXE' signal.

Thus, instead of relying purely on a Bluetooth ARQ mechanism, a BT_SHDN signal informs a co-located Bluetooth transceiver about possible future co-existence issues so that the Bluetooth transceiver can schedule around the possible interference. When a Bluetooth transceiver is operating as a master device, a TXE' signal (modified or unmodified) can be used to delay Bluetooth transmissions so that a slave device's response will not be transmitted during a timeslot when OFDMA co-existence interference is expected. The amount of delay created by the TXE' signal may vary depending on the size of the Bluetooth packets. Note that the delay created by the TXE' signal can readily be applied to a Voice over Asynchronous Connectionless Link (VoACL) and may also be applicable to other types of logical transports.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, co-existence predictor 150 includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A method for co-existence of an orthogonal frequency division multiple access (OFDMA) transceiver with a synchronous frame-based transmitter comprising:
    receiving a transmission enable (TXE) signal indicating that the OFDMA transceiver is transmitting;
    determining, from the TXE signal, an estimated transmission enable (TXE') signal, the TXE' signal being a prediction of the future TXE signal and indicating when the OFDMA transceiver is expected to be transmitting;
    sending the TXE' signal to the synchronous frame-based transmitter to shut down the synchronous frame-based transmitter when a transmission is expected to be sent from the OFDMA transceiver.

2. A method according to claim 1, further comprising:
    ascertaining whether the synchronous frame-based transmitter is operating as a master device or a slave device.

3. A method according to claim 2, further comprising:
    attempting to role switch to a master device, if the ascertaining determines that the synchronous frame-based transmitter is not operating as a master device.

4. A method according to claim 1, wherein the determining comprises:
    observing the TXE signal for a period of time;
    collecting timing data from observing the TXE signal; and
    calculating the TXE' signal from the timing data.

5. A method according to claim 4, further comprising:
    locating boundaries of a synchronous frame-based timeslot.

6. A method according to claim 5, wherein the calculating further comprises:
    modifying the TXE' signal by adding a pulse with a duration equivalent to at least one synchronous frame-based timeslot immediately prior to an existing pulse within the TXE' signal.

7. A method according to claim 5, wherein the calculating further comprises:
    modifying the TXE' signal by shifting a pulse within the TXE' signal ahead in time by at least one synchronous frame-based timeslot.

8. A method according to claim 7, wherein the sending comprises:
    sending the modified TXE' signal to an input capable of disabling the synchronous frame-based transmitter.

9. A method as in claim 7, further comprising
    creating an estimated media access protocol (MAP') signal from a received reception enable (RXE) signal indicating that an OFDMA transceiver is receiving; and
    sending the modified TXE' signal and the MAP' signal to the synchronous frame-based transmitter to shut down the synchronous frame-based transmitter.

10. A method according to claim 1, further comprising:
    transmitting the TXE' signal over a Bluetooth link.

11. An apparatus for co-existence of an orthogonal frequency division multiple access (OFDMA) transceiver with a synchronous frame-based transmitter comprising:
    an observer unit for receiving a transmit-enable (TXE) signal from the OFDMA transceiver;
    an estimator unit, coupled to the observer unit, for creating an estimated transmit-enable signal (TXE') from the TXE signal, the TXE' signal being a prediction of the future TXE signal and;
    a decision logic unit, coupled to the estimator unit, for determining a shut down signal for disabling the synchronous frame-based transmitter from the TXE' signal.

12. An apparatus according to claim 11, wherein the observer unit comprises:
    a microcontroller unit for finding frequency, phase, and duration of repetitive elements of the TXE signal.

13. An apparatus according to claim 11, wherein the observer unit comprises:
    a Fast Fourier Transform block for finding frequency, phase, and duration of repetitive elements of the TXE signal.

14. An apparatus according to claim 11, wherein the observer unit comprises:
    a delay-locked loop for finding frequency, phase, and duration of repetitive elements of the TXE signal.

15. An apparatus according to claim 11, wherein the observer unit comprises:
    a covariance block for finding frequency, phase, and duration of repetitive elements of the TXE signal.

16. An apparatus according to claim 11, wherein the decision logic unit is coupled to the synchronous frame-based transmitter.

17. An apparatus according to claim 11, wherein the synchronous frame-based transmitter receives the shut down signal.

* * * * *